Figure 1:
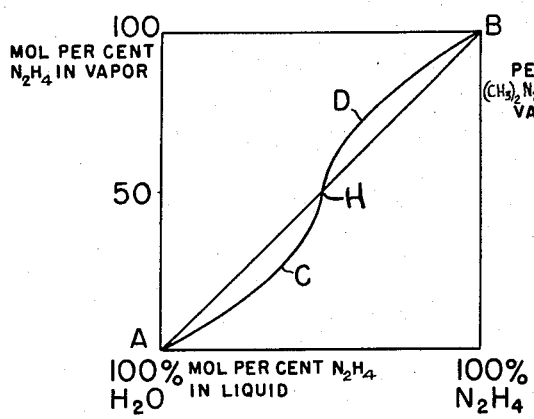

March 3, 1959

B. H. NICOLAISEN 2,876,173

SEPARATION OF UNSYMMETRICAL DIMETHYL-HYDROZINE FROM AQUEOUS SOLUTION CONTAINING NOT MORE THAN 20 PER CENT OF THE FORMER CAUSTIC SODA

Filed Dec. 13, 1955

Bernard H. Nicolaisen
*INVENTOR.*

BY

Adams, Forward & McLean

ATTORNEYS

United States Patent Office 2,876,173
Patented Mar. 3, 1959

2,876,173

SEPARATION OF UNSYMMETRICAL DIMETHYL-HYDRAZINE FROM AQUEOUS SOLUTION CONTAINING NOT MORE THAN 20 PERCENT OF THE FORMER, CAUSTIC SODA

Bernard H. Nicolaisen, Kenmore, N. Y., assignor to Olin Mathieson Chemical Corporation, a corporation of Virginia Application December 13, 1955, Serial No. 552,812

4 Claims. (Cl. 202—39.5)

My invention relates to improvements in the distillation of unsymmetrical dimethylhydrazine and more particularly to the recovery of unsymmetrical dimethylhydrazine from aqueous solutions by distillation.

Hydrazine and unsymmetrical dimethylhydrazine may both be prepared by modifications of the Raschig process. In the manufacture of hydrazine by the Raschig process, dilute aqueous chloroamine, $NH_2Cl$, formed by the reaction of aqueous ammonia and dilute sodium hypochlorite is treated with an excess of ammonia to form hydrazine. After removal of the excess ammonia, the hydrazine is first obtained as a dilute aqueous solution of about one to three percent. A composition approximating hydrazine hydrate can be obtained by fractionation of the aqueous solution of hydrazine since water has a higher vapor pressure than hydrazine hydrate at the same temperatures. To obtain more concentrated solutions of hydrazine by simple distillation is not feasible since the constant boiling composition approximating hydrazine hydrate distills over without change in composition. Extractive distillation with caustic or aniline or other third components as well as chemical methods of dehydration have been used to obtain anhydrous hydrazine from hydrazine hydrate.

Unsymmetrical dimethylhydrazine may be similarly prepared by the reaction of dilute chloroamine solutions, derived from ammonia and dilute sodium hypochlorite, by reaction with dimethylamine. Dimethylhydrazine may also be obtained by other means but the cheapness of the reagents in the Raschig process makes this method economically attractive. The dimethylhydrazine, like hydrazine, is first obtained as a dilute aqueous solution containing about one to three, usually 2.5, percent by weight of dimethylhydrazine. These dilute dimethylhydrazine solutions behave very differently on distillation at atmospheric pressure from dilute aqueous hydrazine. In the hydrazine-water system, water is more volatile than hydrazine hydrate and may be removed overhead to obtain the hydrate as bottoms. In the dimethylhydrazine-water system, no such hydrate is formed and dimethylhydrazine is more volatile than water. Removal of the dimethylhydrazine overhead leaving water as bottoms is therefore theoretically possible. However, because of the peculiar shape of the vapor equilibrium curve in the dimethylhydrazine-water system, this is practically not feasible. The vapors in equilibrium with the liquor at atmospheric pressure are only slightly richer in dimethylhydrazine at low concentrations of the latter and an uneconomically large number of plates is necessary.

The contrasting behavior of hydrazine and dimethylhydrazine with respect to the distillation of aqueous solution thereof is further shown in the accompanying drawings. Figure 1 shows approximately the vapor-liquid equilibrium of aqueous solutions of hydrazine and explains the behavior of aqueous solutions of hydrazine on distillation. Solutions containing more water than correspond to hydrazine monohydrate in equilibrium with the vapors thereof at their boiling points are shown by the portion of the curve ACH. Thus these solutions are in equilibrium with vapors richer in water than the liquid and the difference in composition are sufficient to permit the separation of pure water vapor overhead in a fractionating column having a practical number of plates. As the composition of hydrazine monohydrate is approached, the composition of the vapors approaches that of the liquid and at the azeotropic composition these are identical. The curve HDB of Figure 1 shows that aqueous solutions of hydrazine richer in hydrazine than hydrazine monohydrate have in equilibrium therewith vapors richer in hydrazine than the monohydrate and these vapors may be removed overhead as anhydrous hydrazine using a column having a practical number of plates.

The peculiarly contrasting behavior of aqueous solutions of dimethylhydrazine on distillation at atmospheric pressure are explained by reference to curve A'C'B' of Figure 2. No constant boiling azeotropes are found in this system at atmospheric pressure and all solutions of any proportion of these two components are in equilibrium with their vapors richer in dimethylhydrazine than the liquid. Hence the dimethylhydrazine may theoretically be distilled overhead. In the regions of high dimethylhydrazine concentration shown in the curves of Figure 2, the exact relative positions of the curves are not entirely certain but the process of the present invention relates more particularly to the relative positions in the region of lower concentrations of dimethylhydrazine. The very flat portion of curve A'C'B' approaching tangency to A'B' in the region of low concentrations of dimethylhydrazine means that the vapors are only very slightly richer in dimethylhydrazine than the liquid with which they are in equilibrium. For this reason an extremely large number of plates are necessary in order to separate anhydrous dimethylhydrazine starting from the very dilute aqueous solutions obtained in the synthesis of dimethylhydrazine.

The direct fractionation of the synthesis liquor from the modified Raschig process for dimethylhydrazine can theoretically be used to recover the dimethylhydrazine. The presence of sodium chloride in the synthesis liquor contributes to the separation of dimethylhydrazine and fewer plates are required to produce anhydrous dimethylhydrazine from the synthesis liquor than from a salt-free aqueous solution of dimethylhydrazine of the same concentration. The synthesis liquor typically has a composition comprising, for example, by weight 3 percent of dimethylhydrazine, 87 percent water and 10 percent sodium chloride. The corresponding molar percent are about 1 percent dimethylhydrazine, 95.6 percent water and 3.4 percent sodium chloride. The direct fractionation of this material at atmospheric pressure to obtain a 90 percent recovery of 95 mole percent dimethylhydrazine, when such a solution is fed to the sixth plate from the bottom of a distillation column requires 21 theoretical plates and a reflux ratio of 241:1. This is not practically feasible. Additional quantities of sodium chloride improve the operation but the addition of sufficient sodium chloride to make the separation of concentrated dimethylhydrazine practically feasible results in the use of such concentrated solutions of salt that crystallization becomes a problem.

I have now found that the addition of sodium hydroxide to solutions of dimethylhydrazine and water or to the synthesis liquor avoids this difficulty and permits the introduction of much larger quantities on a molar basis without crystallization difficulties. Furthermore, I have found experimentally that sodium hydroxide is approximately twice as effective, weight for weight, as sodium chloride in improving the separation of dimethylhydrazine.

Effective proportions of caustic can range from about 1 to 30 weight percent based on the feed but it is preferred to add the caustic to the feed to maintain a concentration of from about 5 to 15 percent on the feed tray at equilibrium. The caustic can be added in solid form since it is readily soluble or a more concentrated solution than is to be produced may be added. Thus, for example, 30, 50 or 70 percent aqueous caustic can be used.

Figure 2:
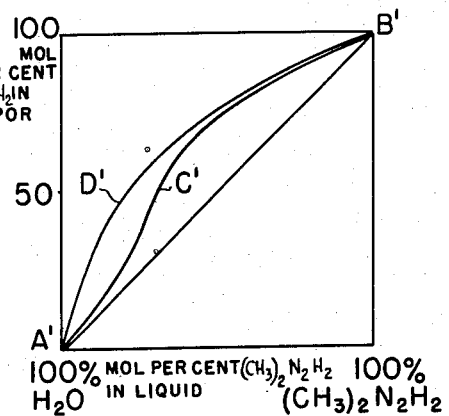

Curve A'D'B' of Figure 2 relates the composition of vapors in equilibrium with liquid solutions of dimethylhydrazine and water containing about 10 percent of caustic. The shape of this curve shows the great advantage of distillation in the presence of caustic, as contrasted with distillation without the addition of caustic. Thus the vapors in equilibrium with the caustic-containing liquid at any temperature are very much richer in dimethylhydrazine than with the caustic-free liquor and the number of plates in a tower necessary to produce anhydrous dimethylhydrazine is very much less. This distillation may be carried out at atmospheric or superatmospheric pressure or at somewhat reduced pressures.

Figure 3:
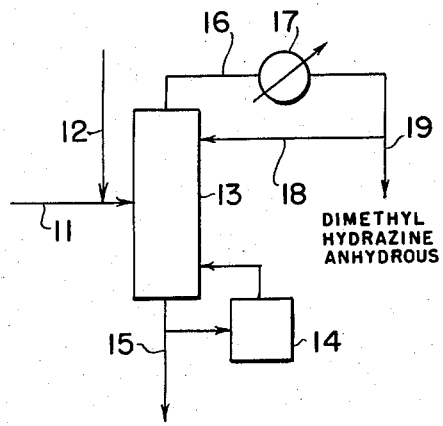

Figure 3 shows one form of the invention in which salt-free, dilute, aqueous hydrazine obtained overhead by evaporating the synthesis liquor is fed by line 11 and mixed with concentrated aqueous caustic via line 12. The combined feed is introduced into fractionating tower 13 heated by reboiler 14. The bottoms comprising diluted aqueous caustic are removed via line 15 for use in the chlorination to form sodium hypochlorite solution for the synthesis reaction. Anhydrous dimethylhydrazine is removed overhead via line 16 and passes through condenser 17. A portion of the condensate is returned via line 18 as reflux to the column and the remainder removed via line 19 constitutes the anhydrous dimethylhydrazine product. In the alternative where synthesis liquor containing salt is charged to the fractionating tower, the salt is removed from the system by crystallizing it from the recovered caustic before using it for chlorination.

In the following examples which illustrate the invenvention, the sodium chloride content has been taken into account by considering it to be equivalent to half the quantity of sodium hydroxide.

Example I

The addition of 12.8 pounds of solid sodium hydroxide to 100 pounds of synthesis liquor containing 3 percent by weight of dimethylhydrazine, 87 percent of water and 10 percent of sodium chloride, results in a feed having a concentration in mole percent of 3.17 percent sodium chloride, 0.93 percent of dimethylhydrazine, 89.94 percent of water and 5.96 mole percent of sodium hydroxide. Fed to a distillation column, operated at atmospheric pressure, on the third plate, 95 mole percent dimethylhydrazine is produced overhead with a recovery of 90 percent using a total of 11 theoretical trays at a reflux ratio of 75:1. The effective sodium hydroxide concentration including the sodium chloride on the feed tray at equilibrium is about 10 percent by weight.

Example II

Fifteen pounds of solid caustic was added per 100 pounds of the same synthesis liquor used in Example I to obtain a feed stream containing 3.13 mole percent of sodium chloride, 0.92 mole percent of dimethylhydrazine, 88.95 mole percent of water and 7.0 mole percent of sodium hydroxide. This was fed to the second tray from the bottom of a column having 9 theoretical plates and resulted in an effective caustic concentration, taking into account the sodium chloride at half its value, of 15 percent at equilibrium. With a reflux ratio of 22:1, 95 mole percent dimethylhydrazine is taken overhead with a recovery of 90 percent.

Example III

When 31.5 pounds of solid sodium hydroxide is added per 100 pounds of the same synthesis stream as used in Example I, an effective caustic concentration of 25 percent results on the feed tray which is the second tray from the bottom of a column having eight theoretical plates. The feed contained 2.91 mole percent of sodium chloride, 0.86 mole percent of dimethylhydrazine, 82.8 mole percent of water and 13.43 mole percent of sodium hydroxide. Using a reflux ratio of 16:1, 95 mole percent of dimethylhydrazine is taken overhead with a recovery of 90 percent.

Example IV

The addition of 100 pounds of 30 percent sodium hydroxide solution per 100 pounds of the same synthesis liquor as used in Example I results in a feed stream containing 1.75 mole percent of sodium chloride, 0.52 mole percent of dimethylhydrazine, 7.73 mole percent sodium hydroxide and 90 mole percent of water. Introduced on the second plate from the bottom of a column having 11 theoretical plates, this results in a composition on the feed tray at equilibrium of 15 percent by weight of sodium hydroxide. With a reflux ratio of 45:1, 95 mole percent dimethylhydrazine is taken overhead with a 90 percent recovery.

I claim:

1. In the separation of unsymmetrical dimethylhydrazine from aqueous solution, the step of distilling an aqueous solution of unsymmetrical dimethylhydrazine containing not more than about 20 mole percent of unsymmetrical dimethylhydrazine and about 1 to 30 weight percent of caustic soda.

2. The method of claim 1 in which the caustic soda is present in an amount of about 5 to 15 percent.

3. The method of claim 1 in which sodium chloride is present in the aqueous solution of unsymmetrical dimethylhydrazine distilled.

4. The method of claim 1 in which the aqueous solution of unsymmetrical dimethylhydrazine which is introduced to the fractional distillation step contains about 1 to 3 percent by weight of unsymmetrical dimethylhydrazine.

References Cited in the file of this patent

UNITED STATES PATENTS

| | | |
|---|---|---|
| 2,676,911 | Nicolaisen | Apr. 27, 1954 |
| 2,678,298 | Nicolaisen | May 11, 1954 |

Disclaimer 2,876,173.—*Bernard H. Nicolaisen*, Kenmore, N.Y. SEPARATION OF UNSYM-METRICAL DIMETHYL-HYDROZINE FROM AQUEOUS SOLUTION CONTAINING NOT MORE THAN 20 PERCENT OF THE FORMER CAUSTIC SODA. Patent dated Mar. 3, 1959. Disclaimer filed Apr. 15, 1963, by the assignee, *Olin Mathieson Chemical Corporation*.

Hereby enters this disclaimer to claims 1, 2 and 4 of said patent.
[*Official Gazette June 18, 1963.*]